(12) United States Patent
Sadakane (10) Patent No.: US 10,710,434 B2
(45) Date of Patent: Jul. 14, 2020

(54) LAMINATED GLASS

(71) Applicant: AGC Inc., Chiyoda-ku (JP)

(72) Inventor: Shunsuke Sadakane, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 184 days.

(21) Appl. No.: 15/984,895

(22) Filed: May 21, 2018

(65) Prior Publication Data

US 2018/0312044 A1  Nov. 1, 2018

Related U.S. Application Data

(63) Continuation of application No. PCT/JP2016/084494, filed on Nov. 21, 2016.

(30) Foreign Application Priority Data

Nov. 24, 2015  (JP) .................................. 2015-228631

(51) Int. Cl.
*B32B 15/04* (2006.01)
*B32B 17/06* (2006.01)
(Continued)

(52) U.S. Cl.
CPC ............ *B60J 1/02* (2013.01); *B32B 17/10036* (2013.01); *B32B 17/1077* (2013.01);
(Continued)

(58) Field of Classification Search
USPC ................................. 428/426, 428, 432, 409
See application file for complete search history.

(56) References Cited

U.S. PATENT DOCUMENTS

| 4,943,140 A | 7/1990 | Woodard |
| 5,812,332 A * | 9/1998 | Freeman ................... B32B 3/02 |
| | | 359/894 |

(Continued)

FOREIGN PATENT DOCUMENTS

| CA | 2 932 635 | 6/2015 |
| CN | 1642866 | 7/2005 |

(Continued)

OTHER PUBLICATIONS

International Search Report dated Jan. 10, 2017 in PCT/JP2016/084494, filed on Nov. 21, 2016 (with English Translation).

(Continued)

*Primary Examiner* — Lauren R Colgan
(74) *Attorney, Agent, or Firm* — Oblon, McClelland, Maier & Neustadt, L.L.P.

(57) ABSTRACT

A laminated glass includes a first glass plate; a second glass plate; an intermediate film located between the first glass plate and the second glass plate, and configured to be bonded to the first glass plate and the second glass plate; and at least one high reflection surface between a surface of the first glass plate on an outer side of the laminated glass and a surface of the second glass plate on an outer side of the laminated glass. The surfaces of the first glass plate and the second glass plate are high reflection surfaces. Each of the high reflection surfaces has optical reflectance of 1% or more with respect to an incident angle of a visible light from a light source. A portion arranged between adjacent high reflection surfaces of the high reflection surfaces has a wedge angle.

8 Claims, 6 Drawing Sheets

(51) Int. Cl.
  *B60J 1/02* (2006.01)
  *B60J 1/00* (2006.01)
  *B32B 17/10* (2006.01)
  *B60K 35/00* (2006.01)
(52) U.S. Cl.
  CPC .. *B32B 17/10082* (2013.01); *B32B 17/10174* (2013.01); *B32B 17/10467* (2013.01); *B32B 17/10568* (2013.01); *B32B 17/10743* (2013.01); *B32B 17/10761* (2013.01); *B32B 17/10779* (2013.01); *B32B 17/10788* (2013.01); *B60J 1/00* (2013.01); *B60K 35/00* (2013.01); *B32B 2307/416* (2013.01); *B32B 2605/00* (2013.01); *B32B 2605/08* (2013.01)

(56) References Cited

U.S. PATENT DOCUMENTS

| | | | | |
|---|---|---|---|---|
| 6,259,559 | B1 * | 7/2001 | Kobayashi | B32B 17/10036 359/485.02 |
| 6,744,478 | B1 * | 6/2004 | Asakura | G02B 27/0101 349/11 |
| 9,423,616 | B2 | 8/2016 | Nambara | B60K 35/00 |
| 9,915,822 | B2 * | 3/2018 | Arndt | B32B 17/10036 |
| 10,175,480 | B2 * | 1/2019 | Zhao | G02B 27/0101 |
| 10,350,859 | B2 * | 7/2019 | Arndt | B32B 17/10541 |
| 10,353,200 | B2 * | 7/2019 | Aoki | B60J 1/02 |
| 10,437,054 | B2 * | 10/2019 | Tso | B60J 1/02 |
| 10,502,954 | B2 * | 12/2019 | Sadakane | B32B 17/10761 |
| 10,545,346 | B2 * | 1/2020 | Waldern | G06F 3/0436 |
| 2004/0070551 | A1 * | 4/2004 | Walck | B32B 17/10036 345/7 |
| 2007/0009714 | A1 * | 1/2007 | Lee | B32B 17/10568 428/172 |
| 2007/0148472 | A1 * | 6/2007 | Masaki | B32B 17/10633 428/426 |
| 2009/0153962 | A1 * | 6/2009 | Okada | G02B 27/0101 359/485.02 |
| 2010/0314900 | A1 * | 12/2010 | Labrot | B32B 17/10036 296/90 |
| 2017/0274631 | A1 * | 9/2017 | Oota | B32B 27/18 |
| 2017/0343806 | A1 * | 11/2017 | Anzai | B60J 1/02 |
| 2018/0267308 | A1 * | 9/2018 | Sadakane | B32B 17/10568 |
| 2019/0033587 | A1 * | 1/2019 | Sadakane | B32B 17/10541 |
| 2019/0126593 | A1 * | 5/2019 | Sadakane | G02B 5/04 |
| 2020/0018954 | A1 * | 1/2020 | Ogawa | B60J 1/00 |

FOREIGN PATENT DOCUMENTS

| | | |
|---|---|---|
| JP | 7-175007 | 7/1995 |
| JP | 2007-223883 | 9/2007 |
| JP | 2011-505330 | 2/2011 |
| JP | 2011-207645 | 10/2011 |
| JP | 2016-153281 | 8/2016 |
| WO | WO 2015/086234 A1 | 6/2015 |
| WO | WO 2017/157660 A1 | 9/2017 |

OTHER PUBLICATIONS

Written Opinion dated Jan. 10, 2017 in PCT/JP2016/084494, filed on Nov. 21, 2016.

* cited by examiner

| | FIRST SURFACE $P_1$ | GLASS PLATE 220 | SECOND SURFACE $P_2$ | INTER-MEDIATE FILM 230 | THIRD SURFACE $P_3$ | GLASS PLATE 210 | FOURTH SURFACE $P_4$ |
|---|---|---|---|---|---|---|---|
| 1 HIGH REFLECTION SURFACES ARE PRESENT ON FIRST, SECOND AND FOURTH SURFACES | ▓ | ○ | ▓ | ○ | | | ▓ |
| 2 HIGH REFLECTION SURFACES ARE PRESENT ON FIRST, THIRD AND FOURTH SURFACES | ▓ | ○ | | | ▓ | ○ | ▓ |
| 3 HIGH REFLECTION SURFACES ARE PRESENT ON FIRST, SECOND, THIRD AND FOURTH SURFACES | ▓ | ○ | ▓ | ○ | ▓ | ○ | ▓ |

FIG.6

| | FIRST SURFACE $P_1$ | GLASS PLATE 220 | SECOND SURFACE $P_2$ | INTERMEDIATE FILM $230_1$ | INTER-FILM POSITION | INTERMEDIATE FILM $230_2$ | THIRD SURFACE $P_3$ | GLASS PLATE 210 | FOURTH SURFACE $P_4$ |
|---|---|---|---|---|---|---|---|---|---|
| HIGH REFLECTION SURFACES ARE PRESENT ON FIRST SURFACE, IN INTER-FILM POSITION, AND ON FOURTH SURFACE | ▨ | ○ | | | ▨ | ○ | | | ▨ |
| | ▨ | ○ | | | ▨ | | | ○ | ▨ |
| | ▨ | | | ○ | ▨ | ○ | | | ▨ |
| | ▨ | | | ○ | ▨ | | | ○ | ▨ |

LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/084494 filed on Nov. 21, 2016 and designating the U.S., which claims priority of Japanese Patent Application No. 2015-228631 filed on Nov. 24, 2015. The entire contents of the foregoing applications are incorporated herein by reference.

BACKGROUND OF THE INVENTION

1. Field of the Invention

The disclosure herein generally relates to a laminated glass.

2. Description of the Related Art

In recent years, head-up displays (in the following, referred to as an "HUD") have become more and more popular. In a head-up display, an image is reflected on a front windshield of a vehicle so that predetermined information is displayed in a driver's view. However, for driver viewing of a view outside the vehicle or of the information displayed by the HUD, there may be a case where a double image is a problem.

A double image that becomes a problem for a driver of a vehicle includes a transmitted double image and a reflected double image. When the front windshield includes a HUD display area used for the HUD and an area outside the HUD display area (transparent area) that is not used for the HUD, although a transmitted double image may be a problem in the HUD display area, generally a reflected double image is the main problem, and in the area outside the HUD display area a transmitted double image is a problem.

It has been known that such reflected double image or transmitted double image can be reduced by using, for a front windshield, a laminated glass having a shape of a wedge. For example, a laminated glass obtained by holding with two glass plates an intermediate film to have a shape of a wedge as a whole has been proposed (See, for example, Japanese Unexamined Patent Application Publication No. H07-175007).

SUMMARY OF THE INVENTION

Technical Problem

Typically, for a front windshield of a vehicle, a laminated glass having a structure of holding an intermediate film with two glass plates have been used. The front windshield may include a laminated glass in which an interface between any one glass plate and an intermediate film was subjected to a high-reflection treatment, or may include a laminated glass in which an interface between one glass plate and the intermediate film or an interface between the other glass plate and the intermediate film are subjected to the high-reflection treatment.

In the aforementioned cases, the above-described reflected double image becomes a reflected triple image or a reflected quadruple image. With the conventional laminated glass having a shape of wedge, reflected multiple images of triple or more could not be reduced.

The present invention was made in view of such a problem, and it is an object of the present invention to provide a laminated glass having a wedge angle that can reduce reflected multiple images of triple or more.

Solution to Problem

According to an aspect of the present invention, a laminated glass includes a first glass plate; a second glass plate; and an intermediate film located between the first glass plate and the second glass plate, and configured to be bonded to the first glass plate and the second glass plate. When a high reflection surface is a surface having an optical reflectance of 1% or more with respect to an incident angle of a visible light from a light source, the laminated glass further includes one or more high reflection surfaces between a reflection surface that is an outer surface of the first glass plate and a reflection surface that is an outer surface of the second glass plate. A portion arranged between adjacent high reflection surfaces has a wedge angle.

[Advantageous Effect of Invention]

According to an aspect of the present invention, a laminated glass having a wedge angle that can reduce reflected multiple images of triple or more is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, embodiments of the present invention will be described. In each drawing, the same reference numeral is assigned to the same component, and redundant explanation will be omitted. In the following, a front windshield of a vehicle will be described as an example, but the present invention is not limited to this, and the laminated glass according to the embodiment can also be applied to other than the front windshield of the vehicle.

[Reflected Double Image, Transmitted Double Image]

Figure 1A:
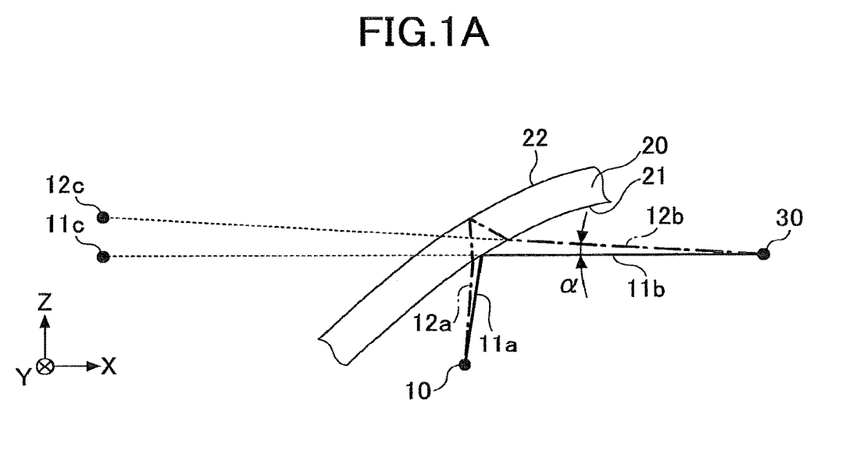
FIGS. 1A and 1B are diagrams for explaining a concept of a double image.
Figure 1B:
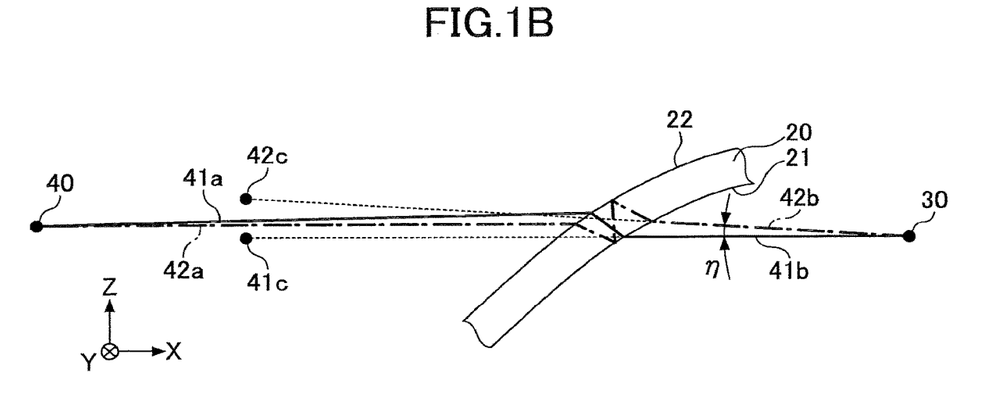

First, concepts of a reflected double image and a transmitted double image will be described. FIGS. 1A and 1B are diagrams for explaining a concept of a double image. FIG. 1A illustrates a reflected double image, and FIG. 1B illustrates a transmitted double image. In FIGS. 1A and 1B, a front-back direction of a vehicle in which the front windshield 20 is installed is an X-direction, a left-right direction of the vehicle is a Y-direction, and a direction perpendicular to an XY-plane is a Z-direction (The same applies to subsequent drawings).

As illustrated in FIG. 1A, a part of light beam 11a emitted from a light source 10 of HUD is reflected on an interior surface 21 of the front windshield 20 of the vehicle, and guided to an eye 30 of a driver as a light beam 11b (primary beam), and is visually recognized by the driver as an image 11c (virtual image) in front of the front windshield 20.

Moreover, a part of light beam 12a emitted from the light source 10 of HUD enters an interior from the interior surface 21 of the front windshield 20 of the vehicle, and is refracted. A part thereof is reflected on an exterior surface 22. Then, furthermore, the part thereof emerges from the interior surface 21 to the outside of the front windshield 20 of the vehicle by refraction, and guided to the eye 30 of the driver as a light beam 12b (secondary beam), and is visually recognized by the driver as an image 12c (virtual image). Note that a thickness of the front windshield 20 is constant, and the interior surface and the exterior surface are parallel to each other.

In this way, the two images 11c and 12c visually recognized by the driver are reflected double images. Moreover, an angle between the light beam 11b (primary beam) and the light beam 12b (secondary beam) is an angle $\alpha$ of the reflected double image. The angle $\alpha$ of the reflected double image is preferably close to zero. Moreover, as illustrated in FIG. 1B, a part of a light beam 41a emitted from a light source 40 enters an interior from the exterior surface 22 of the front windshield 20 of the vehicle and is refracted. Then, a part thereof emerges to the outside of the front windshield 20 from the interior surface 21, and guided to the eye 30 of the driver as a light beam 41b, and visually recognized by the driver as an image 41c.

Moreover, a part of a light beam 42a emitted from the light source 40 enters an interior from the exterior surface 22 of the front windshield 20 of the vehicle and is refracted. A part thereof is reflected on the interior surface 21. Then, furthermore, the part thereof is reflected on the exterior surface 22, and furthermore a part thereof is refracted and emerges to the outside of the front windshield 20 from the interior surface 21 by refraction, and guided to the eye 30 of the driver as a light beam 42b, and visually recognized by the driver as an image 42c.

In this way, the two images 41c and 42c visually recognized by the driver are transmitted double images. Moreover, an angle between the light beam 41b (primary beam) and the light beam 42b (secondary beam) is an angle $\eta$ of the transmitted double image. The angle $\eta$ of the transmitted double image is preferably close to zero.

[Front Windshield (Laminated Glass)]

Figure 2A:
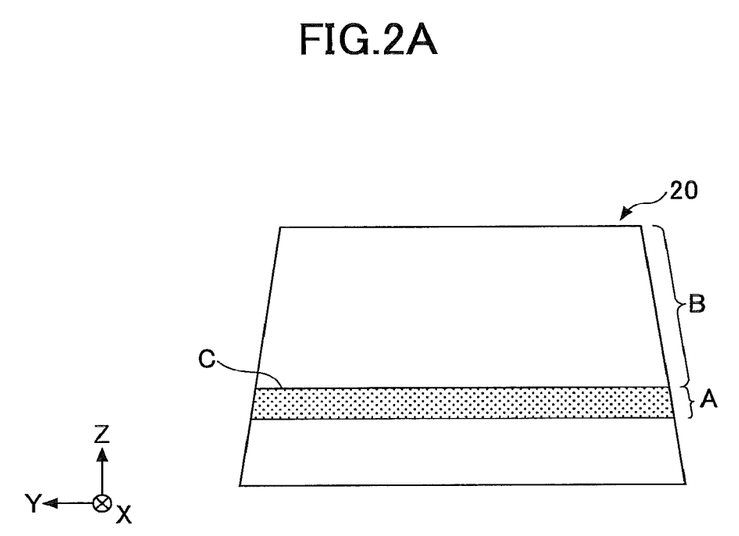
FIGS. 2A and 2B are diagrams for explaining a front windshield for a vehicle.
Figure 2B:
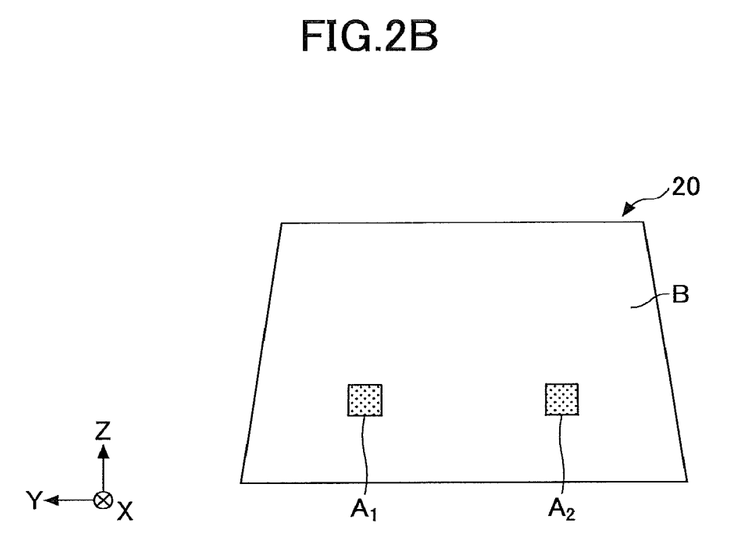
Figure 3:
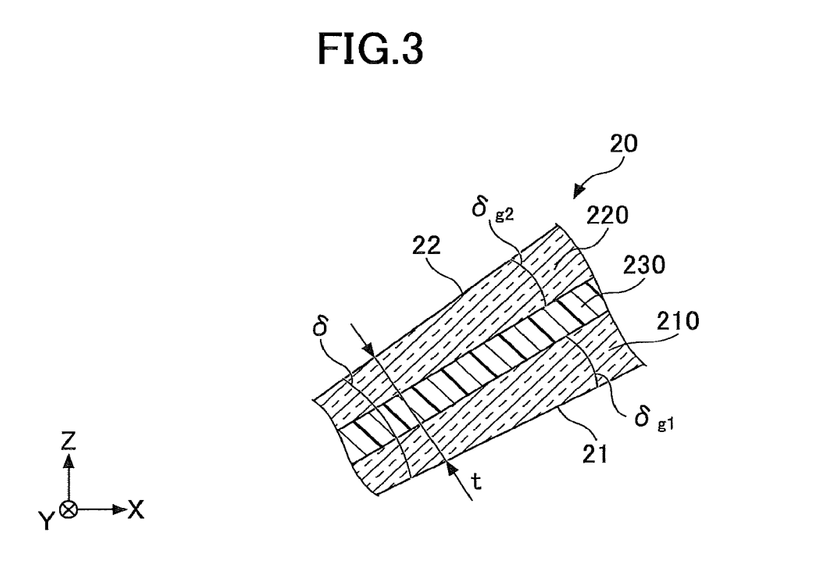
FIG. 3 is a partial cross-sectional diagram depicting the front windshield illustrated in FIGS. 2A and 2B, cut so as to be parallel to a XZ-plane.

FIGS. 2A and 2B are diagrams depicting a front windshield of a vehicle, and schematically a state in which the front windshield is visually recognized from a vehicle front. Moreover, FIG. 3 is a partial cross-sectional diagram depicting the front windshield illustrated in FIGS. 2A and 2B, cut so as to be parallel to the XZ-plane. Note that in FIGS. 2A and 2B, as a matter of convenience, a HUD display area is indicated by a dotted pattern.

As illustrated in FIG. 2A, the front windshield 20 includes an HUD display area A used for the HUD and an area outside the HUD display area B (transparent area) that is not used for the HUD. The HUD display area A is located in a lower part of the front windshield 20, and the area outside the HUD display area B is located adjacent to the HUD display area A and above the HUD display area A in the front windshield 20. A line indicated by C represents a boundary between the HUD display area A and the area outside the HUD display area B. However, the HUD display area may be arranged separated into a plurality of areas, such as an HUD display area $A_1$ and an HUD display area $A_2$, illustrated in FIG. 2B. Alternatively, the HUD display area may be only either one of the HUD display area $A_1$ and the HUD display area $A_2$. Note that the HUD display areas A, $A_1$ and $A_2$ are representative examples of the area used in the head up display according to the present invention.

As illustrated in FIG. 3, the front windshield 20 is a laminated glass provided with a glass plate 210 that is a first glass plate, a glass plate 220 that is a second glass plate, and an intermediate film 230.

In each of the glass plates 210 and 220 of the laminated glass, a thickness changes from one end toward the other opposite end, and each of the glass plates 210 and 220 has lines generated by drawing upon manufacturing. The intermediate film 230 is located between the glass plate 210 and the glass plate 220. The intermediate film 230 is a film with a constant thickness that bonds the glass plate 210 and the glass plate 220 so that the lines of the glass plate 210 are orthogonal to the lines of the glass plate 220.

In this way, in the example illustrated in FIG. 3, the glass plates 210 and 220 are formed having wedge-shapes in a cross-sectional view. In the glass plate 210, an angle between a surface that is to be an interior surface 21 of the front windshield 20 and a surface that contacts the intermediate film 230 will be referred to as a wedge angle $\delta g_1$. Moreover, in the glass plate 220, an angle between a surface that is to be an exterior surface 22 of the front windshield 20 and a surface that contacts the intermediate film 230 will be referred to as a wedge angle $\delta g_2$.

In FIG. 3, because thickness of the intermediate film 230 is uniform, a sum of the wedge angle $\delta g_1$ of the glass plate 210 and the wedge angle $\delta g_2$ of the glass plate 220 is the same as a wedge angle $\delta$ between the interior surface 21 and the exterior surface 22 of the front windshield 20 (a wedge angle of the entire laminated glass). Note that the wedge angle $\delta_1$ of the glass plate 210 and the wedge angle $\delta g_2$ of the glass plate 220 are the same or may be different from each other.

Moreover, the interior surface 21 of the front windshield 20 that is one surface of the glass plate 210 and the exterior surface 22 of the front windshield 20 that is one surface of the glass plate 220 may be flat surfaces or may be curved surfaces. The front windshield 20 may have, for example, a shape that is curved in the vertical direction. Note that t indicates a local thickness of the front windshield 20 (a total thickness of thicknesses of the glass plate 210, the glass plate 220 and the intermediate film 230 at the part).

A glass plate, in which a thickness changes from one end toward the other opposite end, such as the glass plates 210 and 220, can be obtained by devising a condition upon manufacturing by using the float method. That is, by controlling circumferential velocities of a plurality of rolls arranged on both ends of a glass ribbon that moves on a melted metal, a cross section of a glass in a width direction may be a concave shape, a convex shape, or a tapered shape, and a part that has a desired thickness change may be cut out.

The glass plates 210 and 220 include streak-shaped fine irregularities (lines) parallel with respect to the moving direction, by an extension upon manufacturing by using the float method, respectively. Upon using as a front windshield for a vehicle, when the lines are viewed in the horizontal direction with respect to a line of sight of an observer, a distortion occurs and a visibility degrades.

As the intermediate film 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is made plasticized by adding a plasticizing agent. The same applies to the other plasticized resins.

The polyvinyl acetal resin includes a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently.

Normally, a light source for HUD is located in a lower part of the vehicle interior, and projects an image toward the laminated glass. Because the projected image is reflected on the rear surface and the front surface of the glass plate, in order to superimpose both the reflected images, the thickness of the glass is required to vary in parallel with respect to the projection direction. Because the thickness of the glass plate 210 varies in a direction orthogonal to the lines, in order to be used as a glass, on which information is projected, the direction of the lines is orthogonal to the projection direction, i.e. the lines are parallel with a line of sight of an observer inside the vehicle interior, and thus in a direction in which the visibility degrades.

In order to improve the visibility, the laminated glass prepared using the glass plate 210, the glass plate 220, and the intermediate film 230 are preferably arranged so that the lines of the glass plate 210 are orthogonal to the lines of the glass plate 220. According to the above-described arrangement, the distortion, which deteriorates with use of the glass plate 210 only, will be reduced by the presence of the glass plate 220, in which the lines are orthogonal to the glass plate 210, along with the intermediate film 230 that bonds the glass plate 210 and the glass plate 220; and, the visibility is improved.

Furthermore, glasses for vehicle are normally used in a state of a curved shape. The shape formation of glass plates is generally performed, before the respective glass plates adhere via the intermediate film 230 to each other, by heating at a temperature of about 550° C. to 700° C., at which a glass becomes soft, in a shape as desired. An extent of curvature is denoted as a maximum depth of curvature, or a cross-curvature. Here, the maximum depth of curvature (cross-curvature) is a distance from a line that connects midpoints of opposite sides of the laminated glass, among the longer of the two pairs of opposite sides, to the deepest point of the curved portion, in a direction orthogonal to the line (in units of mm) where the convexly curved laminated glass is oriented so that the convex portion side directs downward.

Because streak-shaped fine irregularities occurring on a surface, which will cause a distortion when a laminated glass is formed, are expanded by a shape formation process, the greater the maximum depth of curvature (cross-curvature) is the more visibility is improved. The maximum depths of curvature of the glass plates 210 and the glass plates 220 according to the present invention are not necessarily limited, but are preferably 10 mm or more, more preferably 12 mm or more, and further preferably 15 mm or more.

As described above, typically, a laminated glass that is a front windshield of a vehicle includes a laminated glass in which an interface between any one glass plate and an intermediate film was subjected to a high-reflection treatment. Alternatively, the laminated glass includes a laminated glass in which an interface between one glass plate and the intermediate film or an interface between the other glass plate and the intermediate film are subjected to the high-reflection treatment.

Figure 4:
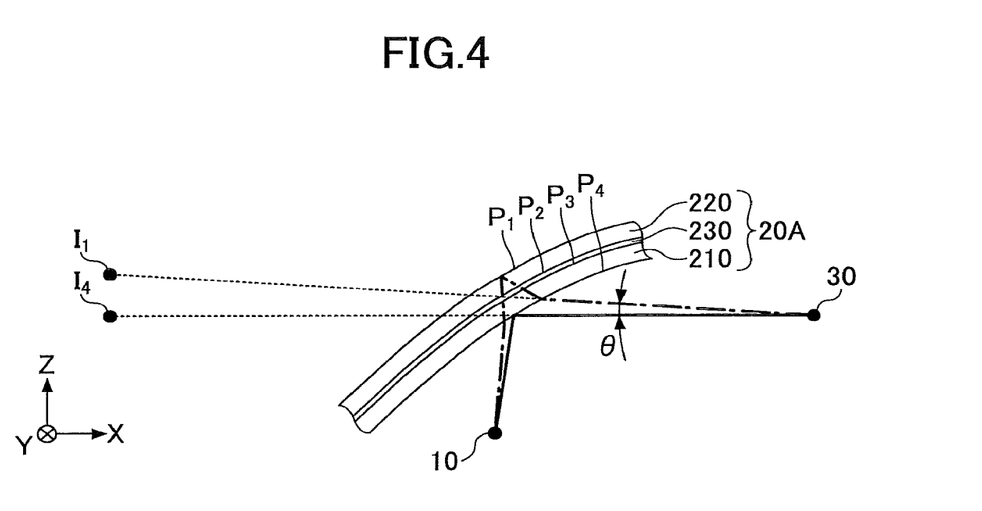
FIG. 4 is a diagram depicting an example of a configuration of the front windshield.

FIG. 4 illustrates an example of a configuration of the front windshield. In the front windshield 20A illustrated in FIG. 4, a second surface $P_2$ that is an interface between the glass plate 220 and the intermediate film 230 and a third surface $P_3$ that is an interface between the glass plate 210 and the intermediate film 230 were subjected to the high-reflection treatment. In contrast, a first surface $P_1$ that is an exterior surface and a fourth surface $P_4$ that is an interior surface are interfaces between glass and air, and thereby high-reflection surfaces according to a difference of refractive index.

FIG. 4 only illustrates an image $I_1$ reflected at the first surface $P_1$ and an image $I_4$ reflected at the fourth surface $P_4$. However, actually an image $I_2$ reflected at the second surface $P_2$ and an image $I_3$ reflected at the third surface $P_3$ are present, and the image is observed quadruply (reflected quadruple image). At this time, a maximum angle θ between the image $I_4$ (main image) reflected at the fourth surface $P_4$, which a light (visible light) from a light source enters first, and the image $I_n$ (n is any one of 1, 2, and 3) reflected at another surface will be defined as a maximum of an angle of a reflected multiple image. Moreover, the angle of a reflected multiple image is defined to be positive when the image $I_n$ is above the image $I_4$, and negative when the image $I_n$ is below the image $I_4$.

Moreover, in the present embodiment, a high-reflection surface is defined to be a surface having a visible light reflectance of 1% or more with respect to an incident angle of a beam from the light source 10 (measured in compliance with JIS R3106 (but measured for the incident angle of the beam from the light source)). In the case of configuring the high reflection surface by processing the high-reflection treatment, a film may be formed by coating a material with a high reflectance, or by laminating a film with a high reflectance. The formed film includes, specifically, a heat ray reflective film consisting mainly of silver, for example.

In the front windshield according to the embodiment, having one or more high reflection surfaces between the exterior surface (high reflection surface) and the interior surface (high reflection surface), a portion arranged between adjacent high reflection surfaces is provided with a wedge angle.

In the example illustrated in FIG. 4, a portion (glass plate 220) arranged between the first surface $P_1$ and the second surface $P_2$, which are adjacent high-reflection surfaces, has a wedge angle. Moreover, a portion (intermediate film 230) arranged between the second surface $P_2$ and the third surface $P_3$, which are adjacent high-reflection surfaces, has a wedge angle. Furthermore, a portion (glass plate 210) arranged between the third surface $P_3$ and the fourth surface $P_4$, which are adjacent high-reflection surfaces, has a wedge angle.

In this way, when the portions arranged between adjacent high reflection surfaces have wedge angles, by setting the respective wedge angles to appropriate values, all the reflected images of the first, second, third and fourth surfaces can be approximately superimposed. That is, it becomes possible to reduce the maximum angle of the reflected multiple image of triple or more, that could not be reduced in the conventional art.

In another example other than the configuration illustrated in FIG. 4, the second surface $P_2$, which is an interface between the glass plate 220 and the intermediate film 230, may be subjected to the high-reflection treatment. Moreover, the third surface $P_3$, which is an interface between the glass plate 210 and the intermediate film 230, may be subjected to the high-reflection treatment. Furthermore, the intermediate film 230 may be configured of a first intermediate film and a second intermediate film, and a high-reflection surface may be present between the first intermediate film and the second intermediate film.

Figure 5:
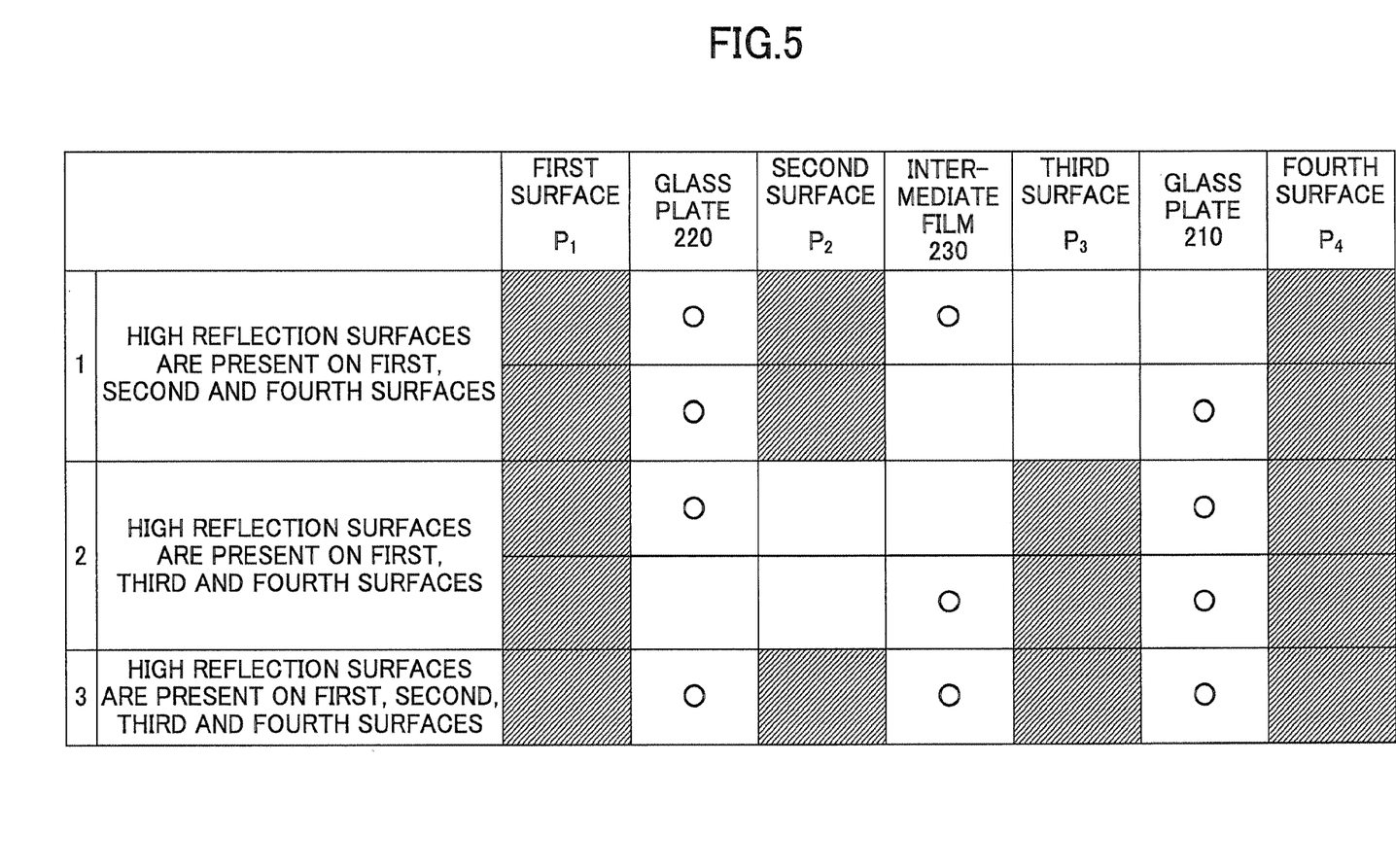
FIG. 5 is a table depicting a first example of a positional relationship between a high reflection film and a portion having a wedge angle.
Figure 6:
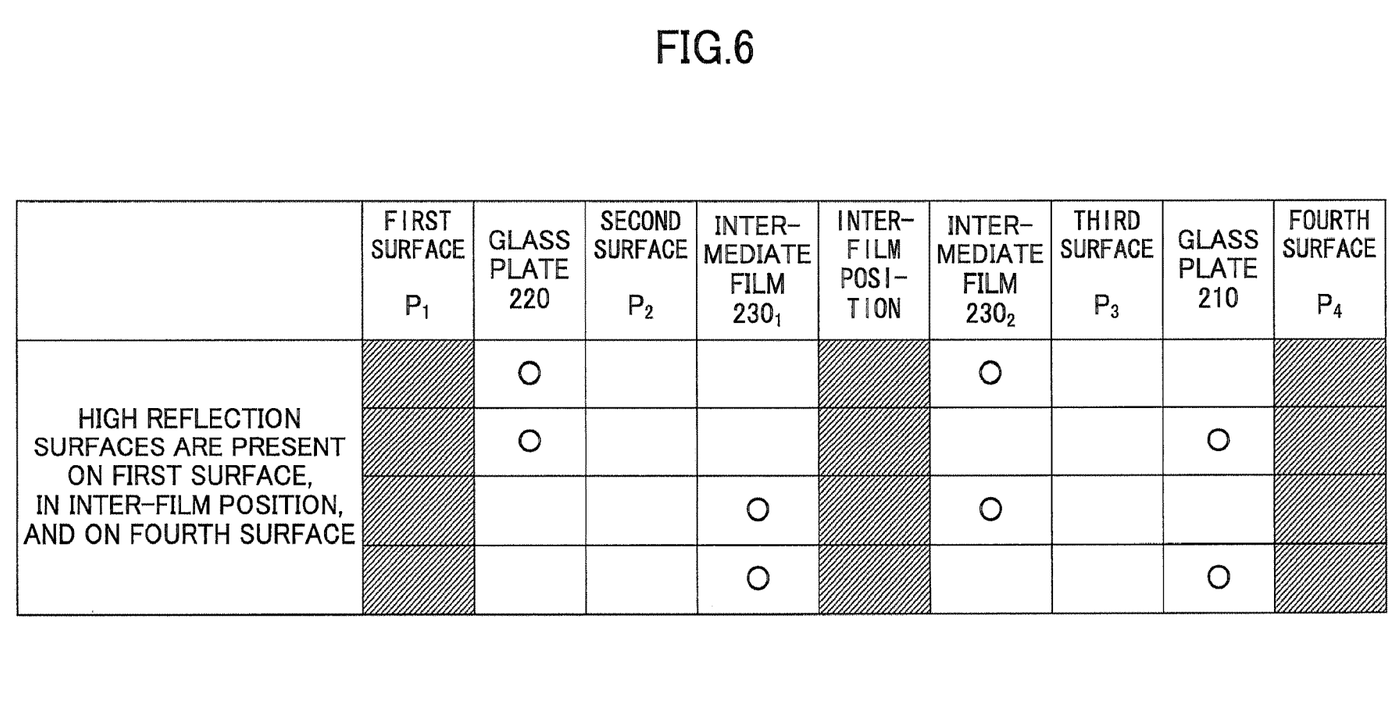
FIG. 6 is a table depicting a second example of the positional relationship between the high reflection film and the portion having a wedge angle.

FIG. 5 and FIG. 6 indicate positions at which a glass plate having a wedge angle or an intermediate film having a wedge angle is arranged, in the respective aforementioned cases, as a whole. Note that, in FIG. 5 and FIG. 6, a shaded area for each surface indicates that the surface is a high-reflection surface. Moreover, a blank area for each surface indicates that the surface is not a high-reflection surface. Moreover, a symbol "O" indicates that the glass plate or the intermediate film corresponding to the area is provided with a wedge angle.

As shown in FIG. 5, in the case of "1", when the first surface $P_1$, the second surface $P_2$ and the fourth surface $P_4$ are high-reflection surfaces, the glass plate 220 located between the first surface $P_1$ and the second surface $P_2$ that are adjacent high reflection surfaces is required to have a wedge angle. Moreover, at least one of the intermediate film 230 and the glass plate 210 located between the second surface $P_2$ and the fourth surface $P_4$ that are adjacent high-reflection surfaces is required to have a wedge angle. But, both the intermediate film 230 and the glass plate 210 may have wedge angles.

Moreover, as shown in FIG. 5, in the case of "2", when the first surface $P_1$, the third surface $P_3$ and the fourth surface $P_4$ are high-reflection surfaces, at least one of the glass plate 220 and the intermediate film 230 located between the first surface $P_1$ and the third surface $P_3$ that are adjacent high-reflection surfaces is required to have a wedge angle. But, both the glass plate 220 and the intermediate film 230 may have wedge angles. Moreover, the glass plate 210 located between the third surface $P_3$ and the fourth surface $P_4$ that are adjacent high-reflection surfaces is required to have a wedge angle.

Moreover, as shown in FIG. 5, in the case of "3", when the first surface $P_1$, the second surface $P_2$, the third surface $P_3$ and the fourth surface $P_4$ are high-reflection surfaces, the glass plate 220 located between the first surface $P_1$ and the second surface $P_2$ that are adjacent high-reflection surfaces is required to have a wedge angle. Moreover, the intermediate film 230 located between the second surface $P_2$ and the third surface $P_3$ that are adjacent high-reflection surfaces is required to have a wedge angle. Moreover, the glass plate 210 located between the third surface $P_3$ and the fourth surface $P_4$ that are adjacent high-reflection surfaces is required to have a wedge angle. Note that the configuration of the case "3" shown in FIG. 5 is the same as the configuration of the case described with reference to FIG. 4.

Moreover, as shown in FIG. 6, when the first surface $P_1$, an interfilm position between an intermediate film $230_1$ (first intermediate film) and an intermediate film $230_2$ (second intermediate film), and the fourth surface $P_4$ are high reflection surfaces, at least one of the glass plate 220 and the intermediate film $230_1$ located between the first surface $P_1$ and the interfilm position that are adjacent high-reflection surfaces is required to have a wedge angle. But, both the glass plate 220 and the intermediate film $230_1$ may have wedge angles. Moreover, at least one of the intermediate film $230_2$ and the glass plate 210 located between the interfilm position and the fourth surface $P_4$ that are adjacent high reflection surfaces is required to have a wedge angle. But, both the intermediate film $230_2$ and the glass plate 210 may have wedge angles. In the front windshield 20A, an area used for the head up display preferably has the aforementioned wedge angle.

Note that in the case of setting a wedge angle in the glass plate 210 or the glass plate 220, the wedge angle is preferably greater than 0 mrad and less than or equal to 1.0 mrad, and more preferably greater than or equal to 0.05 mrad and less than or equal to 0.7 mrad. Moreover, thicknesses of each of the glass plates 210 and 220 are preferably greater than or equal to 1.0 mm and less than or equal to 4 mm, over the entirety of the glass plates 210 and 220. Moreover, in the case of setting a wedge angle in the intermediate film 230, the first intermediate film $230_1$ or the second intermediate film $230_2$, the wedge angle is preferably greater than 0 mrad and less than or equal to 1.0 mrad, and more preferably greater than or equal to 0.05 mrad and less than or equal to 0.7 mrad.

In the front windshield 20A, an area used for the head up display preferably has the aforementioned wedge angle. Note that the above-described wedge angle may not be constant, but may gradually vary. In such a case, an average value of the aforementioned wedge angles preferably falls within the aforementioned range.

Moreover, a thickness of the intermediate film 230 or each of thicknesses of the intermediate film $230_1$ and the intermediate film $230_2$ is preferably 0.3 mm or more and 2.0 mm or less in the entirety of the intermediate film 230 or a sum of the intermediate film $230_1$ and the intermediate film $230_2$. Moreover, the wedge angle δ of the laminated glass (sum of the wedge angle of the glass plate and the wedge angle of the intermediate film) is preferably 1.2 mrad or less. Any of the aforementioned values are necessary in order to cause the maximum angle of the reflected multiple image to fall within a tolerance level.

Practical Examples

Figure 7A:
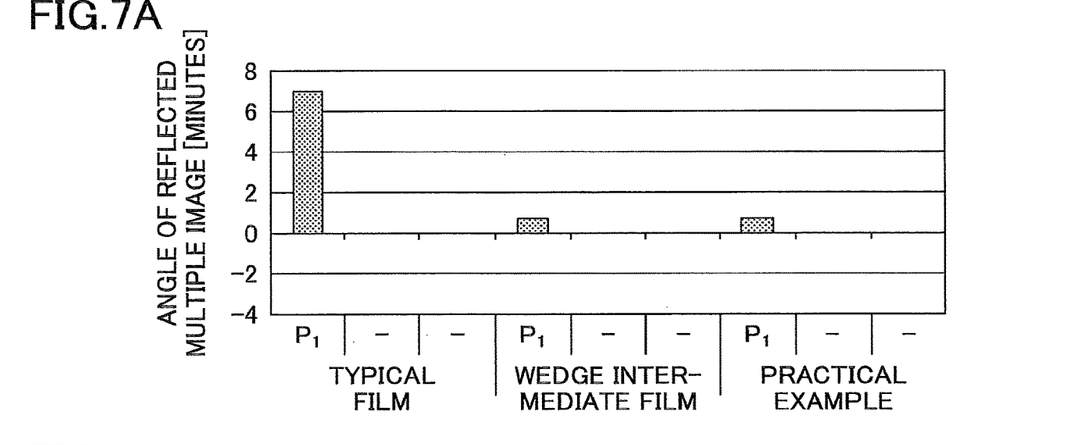
FIGS. 7A to 7C is a graph depicting an example of a relation between a position of a high reflection film and an angle of a reflected multiple image.
Figure 7B:
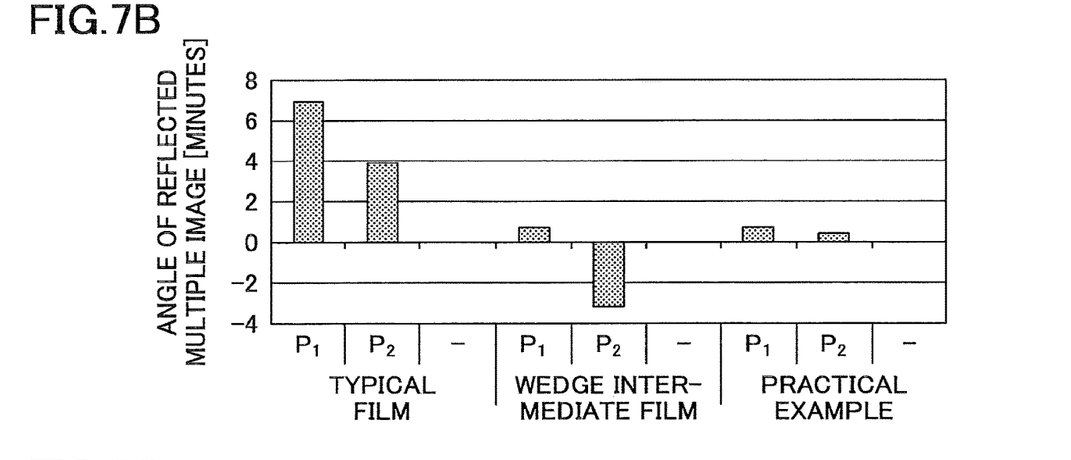
Figure 7C:
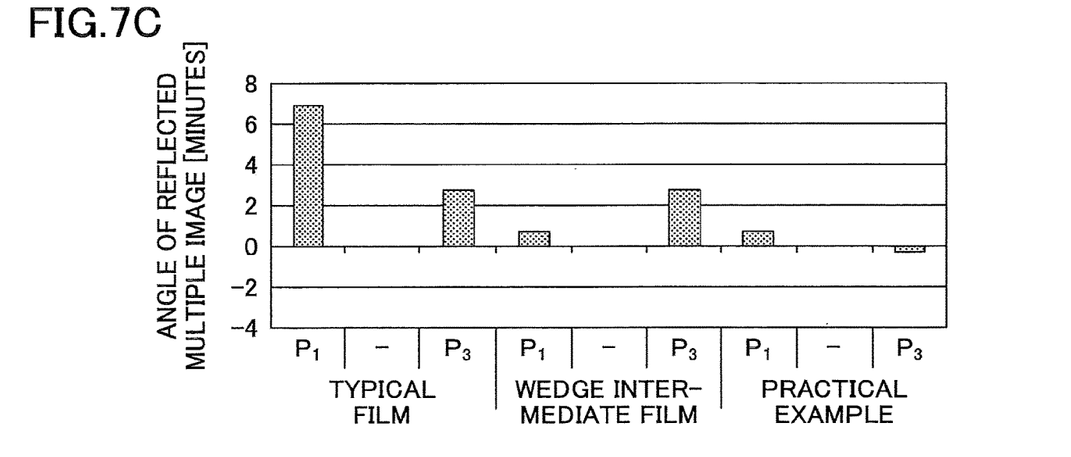

In practical examples, for three cases: where the first surface $P_1$ and the fourth surface $P_4$ are high-reflection surfaces; where the first surface $P_1$, the second surface $P_2$ and the fourth surface $P_4$ are high-reflection surfaces; and where the first surface $P_1$, the third surface $P_3$ and the fourth surface $P_4$ are high-reflection surfaces, the maximum angles of the reflected multiple image between the fourth surface $P_4$ and the respective surfaces were obtained by calculation. Results of calculations are shown in FIGS. 7A to 7C and TABLES 1 to 3. Note that calculations were also performed for the case with a typical film that did not have a wedge angle, as a comparative example 1, and for the case with a wedge-shaped intermediate film, i.e. only the intermediate film 230 was a wedged film, as a comparative example 2.

Here, the maximum angle of the reflected multiple image is preferably ±2.7 minutes or less. The aforementioned value is based on the results of analysis from a viewpoint of a tolerance level in visual observation and a resolution in the visual observation. More preferably the maximum angle of the reflected multiple image is ±1.8 minutes or less. The aforementioned value is based on the results of analysis from a viewpoint of a feeling of discomfort in visual observation and a resolution in the visual observation. Furthermore preferably the maximum angle of the reflected multiple image is ±1.4 minutes or less. The aforementioned value corresponds to a visual acuity resolution of 0.7, the minimum required for a regular car license.

TABLE 1

| | typical film | wedge intermediate film | practical example |
|---|---|---|---|
| | $P_1$ | $P_1$ | $P_1$ |
| maximum angle of reflected multiple image [minutes] | 6.95 | 0.70 | 0.70 |
| wedge angle of glass plate 220 [mrad] | 0 | 0 | 0.2 |
| wedge angle of intermediate film 230 [mrad] | 0 | 0.45 | 0.25 |
| wedge angle of glass plate 210 [mrad] | 0 | 0 | 0 |

As shown in FIG. 7A and TABLE 1, it is found that when the first surface $P_1$ and the fourth surface $P_4$ are high reflection surfaces, in the case of typical films (comparative example 1) the maximum angle of reflected multiple image cannot be controlled to ±2.7 minutes or less, but in the cases where only the intermediate film 230 is a wedged film (comparative example 2) and where the glass plate 220 and the intermediate film 230 are wedged films (practical example) the maximum angle of reflected multiple image can be sufficiently controlled to ±2.7 minutes or less.

TABLE 2

| | typical film | | wedge intermediate film | | practical example | |
|---|---|---|---|---|---|---|
| | $P_1$ | $P_2$ | $P_1$ | $P_2$ | $P_1$ | $P_2$ |
| maximum angle of reflected multiple image [minutes] | 6.95 | 3.91 | 0.70 | −3.21 | 0.70 | 0.41 |
| wedge angle of glass plate 220 [mrad] | 0 | | 0 | | 0.2 | |
| wedge angle of intermediate film 230 [mrad] | 0 | | 0.45 | | 0.25 | |
| wedge angle of glass plate 210 [mrad] | 0 | | 0 | | 0 | |

As shown in FIG. 7B and TABLE 2, when the first surface $P_1$, the second surface $P_2$ and the fourth surface $P_4$ are high reflection surfaces, in the case of typical films (comparative example 1) the maximum angle of reflected multiple image cannot be controlled sufficiently to ±2.7 minutes or less. Moreover, in the case where only the intermediate film 230 is a wedged film (comparative example 2), the angle of reflected multiple image between the fourth surface $P_4$ and the first surface $P_1$ is 0.70 minutes that is less than ±2.7 minutes, but the angle of reflected multiple image between the fourth surface $P_4$ and the second surface $P_2$ is −3.21 minutes. Thus, the maximum angle of reflected multiple image cannot be controlled sufficiently to ±2.7 minutes or less.

In contrast, in the case where the glass plate 220 and the intermediate film 230 are wedged films (practical example), the angle of reflected multiple image between the fourth surface $P_4$ and the first surface $P_1$ is 0.70 minutes, and the angle of reflected multiple image between the fourth surface $P_4$ and the second surface $P_2$ is 0.41 minutes. Thus, the maximum angle of reflected multiple image can be controlled sufficiently to ±2.7 minutes or less.

TABLE 3

| | typical film | | wedge intermediate film | | practical example | |
|---|---|---|---|---|---|---|
| | $P_1$ | $P_3$ | $P_1$ | $P_3$ | $P_1$ | $P_3$ |
| maximum angle of reflected multiple image [minutes] | 6.95 | 2.75 | 0.70 | 2.75 | 0.70 | −0.27 |
| wedge angle of glass plate 220 [mrad] | 0 | | 0 | | 0 | |
| wedge angle of intermediate film 230 [mrad] | 0 | | 0.45 | | 0.27 | |
| wedge angle of glass plate 210 [mrad] | 0 | | 0 | | 0.18 | |

As shown in FIG. 7C and TABLE 3, when the first surface $P_1$, the third surface $P_3$ and the fourth surface $P_4$ are high reflection surfaces, in the case of typical films (comparative example 1) both the angle of reflected multiple image between the fourth surface $P_4$ and the first surface $P_1$ and the angle of reflected multiple image between the fourth surface $P_4$ and the third surface $P_3$ exceed±2.7 minutes. Thus, the maximum angle of reflected multiple image cannot be controlled sufficiently to ±2.7 minutes or less.

Moreover, in the case where only the intermediate film 230 is a wedged film (comparative example 2), the angle of reflected multiple image between the fourth surface $P_4$ and the first surface $P_1$ is 0.70 minutes, and the angle can be sufficiently controlled to ±2.7 minutes or less. But the angle of reflected multiple image between the fourth surface $P_4$ and the third surface $P_3$ is 2.75 minutes. Thus, the maximum angle of reflected multiple image cannot be controlled sufficiently to ±2.7 minutes or less.

In contrast, in the case where the intermediate film 230 and the glass plate 210 are wedged films (practical example), the angle of reflected multiple image between the fourth surface $P_4$ and the first surface $P_1$ is 0.70 minutes, and the angle of reflected multiple image between the fourth surface $P_4$ and the third surface $P_3$ is −0.27 minutes. Thus, the maximum angle of reflected multiple image can be controlled sufficiently to ±2.7 minutes or less.

As described above, by the conventional method of using typical films that are not provided with wedge angles or setting only an intermediate film as a wedged film, when in addition to an exterior surface of a front windshield (high reflection surface) and an interior surface (high reflection surface), one or more high reflection surface is present between the interior surface and the exterior surface, a maximum angle of reflected multiple image cannot be controlled sufficiently. That is, all reflected images of the respective high reflection surfaces cannot be superimposed on each other.

In contrast, as described in the practical example, when a glass plate having a wedge angle or an intermediate film having a wedge angle is always present between adjacent high reflection surfaces, and the respective wedge angles are set to appropriate values, even in a front windshield in which a high reflection surface is arranged on a surface other than the first surface or the fourth surface, the maximum angle of reflected multiple image can be sufficiently controlled to ±2.7 minutes or less. That is, all the reflected images of the respective high reflection surfaces can be approximately superimposed. However, the combination of values of wedge angles in the practical example, shown in TABLES 1 to 3, is merely an example. Various combinations of values of wedge angles may be employed so as to control the maximum angle of reflected multiple image to ±2.7 minutes or less.

As described above, the preferred embodiments and the like have been described in detail. However, the present invention is not limited to the above-described specific embodiments, and various variations and modifications may be add without deviating from the scope of the present invention to the aforementioned embodiments.

REFERENCE SIGNS LIST 10,40 light source
11a, 11b, 12a, 12b, 41a, 41b, 42a, 42b beam
11c, 12c, 41c, 42c image
20, 20A front windshield
21 interior surface
22 exterior surface
30 eyes
210, 220 glass plate
230, $230_1$, $230_2$ intermediate film
A, $A_1$, $A_2$ HUD display area
B area outside HUD display area
C boundary

What is claimed is:

1. A laminated glass comprising:
a first glass plate;
a second glass plate;
an intermediate film located between the first glass plate and the second glass plate, and configured to be bonded to the first glass plate and the second glass plate; and
at least one high reflection surface between a surface of the first glass plate on an outer side of the laminated glass and
a surface of the second glass plate on an outer side of the laminated glass,
wherein the surfaces of the first glass plate and the second glass plate are high reflection surfaces,
wherein each of the high reflection surfaces has optical reflectance of 1% or more with respect to an incident angle of a visible light from a light source, and
wherein a portion arranged between adjacent high reflection surfaces of the high reflection surfaces has a wedge angle.

2. The laminated glass according to claim 1, further comprising:
an HUD area used for a head-up display,
wherein within the HUD area of the laminated glass, a portion arranged between adjacent high reflection surfaces has a wedge angle,
wherein the portion includes the first glass plate within the HUD area or the second glass plate within the HUD area, and
wherein a wedge angle of the first glass plate within the HUD area or the second glass plate within the HUD area is greater than 0 mrad and less than or equal to 1.0 mrad.

3. The laminated glass according to claim 2,
wherein the portion includes the intermediate film within the HUD area, and
wherein a wedge angle of the intermediate film within the HUD area is greater than 0 mrad and less than or equal to 1.0 mrad.

4. The laminated glass according to claim 1,
wherein a maximum value of an angle between an image reflected at a high reflection surface that the visible light from the light source first enters and an image reflected at another high reflection surface is less than or equal to ±2.7 minutes.

5. The laminated glass according to claim 4,
wherein the maximum value of the angle between the image reflected at the high reflection surface that the visible light from the light source first enters and the image reflected at the other high reflection surface is less than or equal to ±1.8 minutes.

6. The laminated glass according to claim 5,
wherein the maximum value of the angle between the image reflected at the high reflection surface that the visible light from the light source first enters and the image reflected at the other high reflection surface is less than or equal to ±1.4 minutes.

7. The laminated glass according to claim 1,
wherein a sum of wedge angles of the first glass plate, the second glass plate and the intermediate film is 1.2 mrad or less.

8. The laminated glass according to claim 1,
wherein the intermediate film includes a first intermediate film and a second intermediate film, and wherein the laminated glass further includes a high reflection surface between the first intermediate film and the second intermediate film.

\* \* \* \* \*